Patented May 10, 1927.

1,627,725

UNITED STATES PATENT OFFICE.

CHARLES E. BRADLEY, OF MONTCLAIR, NEW JERSEY, AND WILLIS A. GIBBONS, OF NEW YORK, N. Y., ASSIGNORS TO THE NAUGATUCK CHEMICAL COMPANY, A CORPORATION OF CONNECTICUT.

PROCESS FOR COMBINING HALOGEN-CONTAINING MATERIALS WITH RUBBER OR SIMILAR SUBSTANCES AND PRODUCTS RESULTING THEREFROM.

No Drawing.  Application filed June 20, 1921. Serial No. 479,100.

This invention relates to processes for combining halogen-containing materials with rubber or similar substances. It is more particularly directed to processes and products therefrom for compounding halogens and halogen acids with either combined or uncombined rubber in the presence of a solvent, or agent for swelling the rubber.

The expression combined rubber herein used is intended to include rubber vulcanized with sulphur, nitro-compounds or other vulcanizing agents and rubber resulting from other chemical treatment such as halogenation etc. The term uncombined rubber includes latex or forms intermediate latex and crude rubber, crude rubber or unvulcanized rubber or rubber untreated chemically.

Processes heretofore employed for chlorination of rubber in the form of crude rubber or vulcanized rubber have employed either solvents which are not readily attacked by chlorine such as chloroform, carbon tetrachloride, or other halogen-containing solvent. Such solvents are expensive and increase the cost of processes employing them accordingly. Crude rubber has been chlorinated in solution in benzol but where this solvent has been employed no precautions have been taken to prevent formation of chlorbenzols with the result that it has been necessary to preciptate and wash the resulting product to free it from such impurities. Furthermore the chlorination of crude rubber as practiced in these prior processes has been conducted in two steps, namely, a first step consisting in forming a cement of rubber and the solvent chosen, and a second step consisting in chlorination of the cement. The employment of two steps causes extra handling, an increase in the quantity of solvent required and consequently a proportionately increased cost.

One of the objects of the present invention accordingly is to provide a process of the kind described permitting the employment of benzol or other inexpensive solvent which may be attackable by a halogen or halogen acid under conditions permitting the formation of rubber compounds with such halogen or halogen acid while preferably avoiding the formation of halogen-solvent compounds. Another object of the invention is to provide a simple process of the kind described which shall eliminate the necessity of forming a cement prior to halogenation as previously practiced. Another object of the invention is to provide a series of products from both uncombined and combined rubber treated with halogen or halogen acids having characteristics which fit them to serve as plastics, coatings, etc.

The invention accordingly broadly consists of a process for treating combined or uncombined rubber or the like which comprises, treating the rubber with a crude rubber solvent attackable by a halogen, and simultaneously halogenating the rubber.

In carrying out the process in its preferred form 350 kg. of ground soft vulcanized rubber, preferably inner tubes from which any excess of sulphur may have been removed by treatment with acetone or alkali, are placed in an interiorly-enameled jacketed kettle provided with a stirring apparatus. The jacket is provided with inlets and outlets for water and steam in order that the temperature of the mass being treated may be controlled. There is added to the ground rubber say 5000 litres of benzol or similar solvent for crude rubber which in the case of the vulcanized inner tubes is adapted to swell these tubes. The quantity of benzol may be varied in accordance with the use proposed for the finished product as will be readily understood. In case a thin solution is desired, which may serve as a varnish, the quantity of benzol may be greater than 5000 litres. If a thick mass or dry resulting product is desired the quantity is reduced below 5000 litres. The inner part of the kettle containing the rubber and benzol has an inlet and outlet for introducing the halogen-containing material. Chlorine is simultaneously passed into the mixture of combined rubber and benzol at the rate of eight to ten thousand litres per minute. The reaction is an exothermic one and water is passed through the jacket of the kettle so that the temperature is maintained at approximately the boiling point of the benzol. Flow meters are stationed at the inlet and outlet side of the kettle, at either side of water-wash bottles, so that the amount of chlorine supplied and the quantities of chlorine and hydrochloric acid, hydrochloric acid being evolved in the reaction, may be recorded. The chlorination is preferably stopped as soon as it is found that the quantity of chlorine going out begins to increase markedly as this indicates that the rubber is all or practically all converted.

The main flow of gases proceeding from the kettle is passed through a spray scrubber or other type of scrubber to remove the hydrochloric acid and then preferably passed to a second chlorinating kettle connected in series with the first kettle, the second kettle being charged with a similar quantity of benzol and combined rubber for treatment. In other words the kettles are operated as a pair, first one kettle being charged and receiving the chlorine gas direct while the second kettle receives the gas after it has passed through the materials in the first kettle and when the first kettle is fully chlorinated the direct flow of gas is passed through the second kettle and the gases passing from the second kettles are then passed into a new lot of material in the first kettle.

The chlorinated product dissolved in the solvent may be run preferably by pressure flow to enamel-lined tanks or other acid-resisting containers where it is freed from residual hydrochloric acid preferably by blowing air through the solution for several hours, or until tests show that hydrochloric acid is substantially absent. The air used for this purification should preferably be strained and preheated if it is desired to concentrate the liquid at the same time as hydrochloric acid is removed. In this event the gases coming off from the blowing operation are passed preferably through a scrubber to remove the hydrochloric gas, through a condenser to remove the benzol and through a solvent recovery system to remove the last traces of benzol. If desired unheated air may first be blown through to remove hydrochloric acid and thereafter preheated air to distill off a quantity of benzol. Evaporation may be accomplished without introducing air by passing the material onto a heated drum and driving off the volatile materials.

If it is desired to mix compounding ingredients with the chlorinated product these may be introduced on a mill for example of the type used to mix paint, or on a rubber mill or rubber mixer. The material after mixing may be dried to sheet form on a drum drier preferably provided with solvent recovery apparatus. It may be scraped from the drum by a knife. If it is desired to market the material as a varnish gum, it will be substantially ready for such marketing when recovered from the drum.

The chlorination of crude rubber may be carried out in a similar manner. The material obtained from crude rubber is more particularly adapted to forming molded articles, and where molding of this material is desired or of any of the products herein mentioned the product as obtained from the drum will be cut into convenient shapes to serve as blanks for any desired molding operations, and molding preferably under pressure may be then carried out in sheet form or other forms which may be then sawed, drilled, machined or otherwise handled. The material may be polished if desired. Various compounding ingredients and coloring matters may be added to this chlorinated product to provide variously colored mixtures. The material has been found to possess high resilience. Tests on a ball made from this material compared with a billiard ball of ivory show that the resilience is greater than that of ivory.

The hydrochloride of either crude or vulcanized or other combined rubber may be formed by carrying out a similar process substituting for the chlorine gas used, hydrochloric acid gas, which may be made from the combination of aqueous hydrochloric acid and sulphuric acid by distillation.

It has been found also that a halogenated compound of rubber may be formed in which both hydrochloric acid and chlorine have been combined with the rubber molecule. The procedure for forming such a compound is as follows: 350 kg. of finely ground high-grade scrap inner tubes, which, preferably have been previously extracted with acetone, alkali or the like are treated with 5000 litres of benzol in an apparatus like that employed in the preferred embodiment above. Hydrochloric acid gas is then let into the supension until the readings of the flow meters indicate that no further absorption is occurring. When sufficient hydrochloric acid gas has been introduced its flow is stopped and thereupon chlorine is similarly introduced into the mass until the flow meters indicate that no more chlorine is being absorbed when the flow of this gas is stopped. The product thus formed contains added hydrochloric acid and substituted chlorine. The reaction here is also an exothermic one and care should be taken that the temperature is controlled by admission of water if necessary to the water jacket. It is pointed out that the process may be conducted as a continuous one following the introduction of hydrochloric acid immediately by that of chlorine or these two steps may be non-continuous if desired. The product formed is soluble in benzol, carbon tetrachloride, chloroform and various other solvents and when the solution is spread upon a surface and allowed to dry a film is formed.

A similar product to that obtained in the chlorination of ordinary soft vulcanized rubber may be secured by the treatment of hard rubber which has been ground to a dust adapted to pass a forty mesh screen. The material is preferably extracted with acetone or other material for removing free sulphur and then subjected to a chlorination process as above. A dark brown liquid is obtained, which dries to a smooth varnish, when spread on glass.

It has also been found that crude rubber treated with sulphur chloride in the proportion of 40 parts of crude rubber to 80 parts of sulphur chloride, the crude rubber having been dissolved in benzol, to produce the sulphur chloride product of crude rubber, may be dried to a hard mass and chlorinated without extraction of free sulphur. The chlorination is preferably carried out as given above in the preferred embodiment. The material obtained upon chlorination gives a substance suitable as a varnish of a brilliant light yellow color.

Similarly to the last mentioned procedure vulcanized soft rubber may also be treated with sulphur chloride by application to 40 grams of ground inner tubes for example, of 80 grams of sulphur chloride in the presence of benzol. The material remains suspended in the benzol and is air-dried and powdered and is then subjected to chlorination in accordance with the preferred embodiment above. The product resembles closely the material obtained in the preferred embodiment and furnishes a highly satisfactory light colored varnish material.

Although chlorine and hydrochloric acid have been mentioned in connection with the use of combined and uncombined rubber, it will also be understood that other halogens and halogen compounds may be employed such as bromine and iodine, hydrobromic acid and hydriodic acid and that materials other than rubber may be employed such as balata and pontianac either treated or untreated with sulphur or other materials. It will also be understood that the chlorination or other halogenation process may be stopped short of full halogenation of the rubber or other materials operated upon, providing intermediate products having different properties than where full chlorination or other halogenation takes place. It will also be apparent that solvents other than benzol may be employed such as toluol and xylol and other rubber solvents.

As many apparently widely different embodiments of this invention may be made without departing from the spirit thereof, it will be understood that we do not intend to limit ourselves to the specific embodiment herein set forth except as indicated in the appended claims.

Having thus described our invention, what we claim and desire to protect by Letters Patent is:—

1. A process for combining rubber with a halogen which comprises treating the rubber with an organic solvent capable of swelling the rubber and attackable by a halogen, and simultaneously halogenating the undissolved rubber thereby substantially avoiding halogenation of the solvent and solution of the rubber.

2. A process for combining a halogen with rubber which comprises treating the rubber with a chlorine-free organic solvent capable of swelling the rubber, and simultaneously halogenating the undissolved rubber thereby substantially avoiding halogenation of the solvent and solution of the rubber.

3. A process for treating rubber which comprises treating the rubber with an organic solvent attackable by a halogen and capable of swelling the rubber and simultaneously halogenating the undissolved rubber, thereby substantially avoiding halogenation of the solvent and solution of the rubber.

4. A process for treating rubber which comprises treating rubber with benzol, and simultaneously halogenating the rubber without waiting for solution of the rubber.

5. A process for treating rubber which comprises treating the rubber with benzol, and simultaneously chlorinating the rubber without waiting for solution of the rubber.

6. A process of the kind described which comprises softening combined rubber with an organic solvent attackable by a halogen and adapted to swell the rubber, and simultaneously subjecting the rubber so treated to a stream of a halogen containing gas, and halogenating the combined rubber.

7. A process of the kind described which comprises softening combined rubber with benzol, simultaneously subjecting the rubber so treated to a stream of chlorine, and chlorinating the combined rubber.

8. A process of the kind described which comprises swelling rubber combined with sulphur in benzol, simultaneously passing a current of chlorine gas into the swollen undissolved rubber until the rubber is saturated, discontinuing the stream of chlorine upon saturation of the rubber and recovering the chlorinated combined rubber.

9. A process for treating rubber which comprises treating rubber with a solvent, introducing a halogen acid, an elementary halogen thereinto and recovering the combination of rubber, halogen acid, and elementary halogen.

10. A process for treating rubber which comprises treating rubber with a solvent, introducing hydrochloric acid gas into the mixture of rubber and solvent, chlorinating the combined rubber and hydrochloric acid, and recovering the combined-hydrochloric-acid-and-chlorinated-rubber.

11. As a new compound rubber combined with a halogen acid and an elementary halogen.

12. As a new compound rubber combined with hydrochloric acid and chlorine.

13. The method of producing a composition of matter which comprises treating a gum hydrohalide with a halogen.

14. The method of producing a composition of matter which comprises treating a rubber hydrohalide with a halogen.

15. The method of producing a composition of matter which comprises treating a gum hydrohalide with chlorine.

16. The method of producing a composition of matter which comprises treating a rubber hydrohalide with chlorine.

17. The method of producing a composition of matter which comprises treating rubber hydrochloride with chlorine.

18. The reaction product of a halogen with a gum hydrohalide.

19. The reaction product of a halogen with a rubber hydrohalide.

20. The reaction product of chlorine with a gum hydrohalide.

21. The reaction product of chlorine with a rubber hydrohalide.

22. Chlorinated rubber hydrochloride.

23. The evaporation residuum of a solution of the reaction product of chlorine with rubber hydrochloride.

Signed at New York, New York, this 14 day of June, 1921.

CHARLES E. BRADLEY.
WILLIS A. GIBBONS.